US006821101B2

United States Patent
Köhler et al.

(10) Patent No.: US 6,821,101 B2
(45) Date of Patent: Nov. 23, 2004

(54) INJECTION UNIT FOR INJECTION MOLDING MACHINES WITH CONTINUOUSLY OPERATING PLASTICIZING UNIT

(75) Inventors: Ingo Köhler, Köln (DE); Ansgar Jaeger, Lauf (DE)

(73) Assignee: Demag Ergotech GmbH, Schwaig (DE)

( * ) Notice: Subject to any disclaimer, the term of this patent is extended or adjusted under 35 U.S.C. 154(b) by 49 days.

(21) Appl. No.: 10/121,940

(22) Filed: Apr. 12, 2002

(65) Prior Publication Data

US 2002/0168444 A1 Nov. 14, 2002

(30) Foreign Application Priority Data

Apr. 12, 2001 (DE) .......................................... 101 18 486

(51) Int. Cl.[7] .............................................. B29C 45/16
(52) U.S. Cl. ........................ 425/130; 425/557; 425/559
(58) Field of Search ................................ 425/130, 557, 425/559

(56) References Cited

U.S. PATENT DOCUMENTS

| 3,417,433 | A | * | 12/1968 | Teraoka | .................... | 425/559 |
| 4,124,308 | A | * | 11/1978 | Sokolow | .................... | 425/557 |
| 5,454,995 | A |   | 10/1995 | Rusconi et al. | | |

FOREIGN PATENT DOCUMENTS

| CH | 423 197 | 4/1967 |
| DE | 1 142 229 | 7/1963 |
| DE | 2 343 129 A1 | 3/1974 |
| DE | 36 00 566 C1 | 7/1987 |
| DE | 38 41 728 C1 | 3/1990 |
| DE | 197 15 229 A1 | 10/1998 |
| DE | 198 59 472 A1 | 11/2000 |

* cited by examiner

Primary Examiner—Tim Heitbrink
(74) Attorney, Agent, or Firm—Henry M. Feiereisen

(57) ABSTRACT

An injection assembly for an injection molding machine, with a continuously operating plasticizing unit, includes a piston-type injection unit and an arrangement for intermediate storage and discharge of melt. Several melt reservoirs with melt inlet openings are provided between the plasticizing unit and the piston-type injection unit. Melt lines that connect the melt reservoirs with each other and with the plasticizing unit extend to the melt inlet openings. The melt reservoirs include actuatable work pistons for discharging the melt, wherein the work pistons can open and close the melt inlet openings in the melt reservoirs to divert the melt flow. The disclosed injection unit increases the total volume of bufferable melt and allows individual and separate adjustment of the reservoir volumes and the discharge velocity of the individual melt reservoirs. In addition, switching valves can be eliminated since the melt flow is switched by the work pistons.

17 Claims, 3 Drawing Sheets

INJECTION UNIT FOR INJECTION MOLDING MACHINES WITH CONTINUOUSLY OPERATING PLASTICIZING UNIT

CROSS-REFERENCES TO RELATED APPLICATIONS

This application claims the priority of German Patent Application, Serial No. 101 18486.7 filed Apr. 12, 2001, pursuant to 35 U.S.C. 119(a)–(d), the subject matter of which is incorporated herein by reference.

BACKGROUND OF THE INVENTION

The present invention relates, in general, to an injection unit, and more particularly, to an injection unit for an injection molding machine with a continuously operating plasticizing unit, a piston-type injection unit, and means for intermediate storage of the melt. The invention has applications for forming compounds of plastic melts and additives, in particular to introducing natural or long fibers, as well as for injecting the compound into a closing unit of an injection molding machine.

German Pat. No. DE 38 41 728 C1 and Swiss Pat. No. CH 423 197 describe the introduction of fillers and additives into a polymer matrix using single screw or multiple screw extruders. According to Swiss Pat. No. CH 423 197, long fibers (rovings) are introduced into the base material by feeding the rovings with a rotating screw. The rotation speed of the screw and the quantity of rovings determine the fiber fraction in the plastic melt. Kneading elements can be used to better homogenize the fibers in the melt and to bring the fibers to a desired length.

Not only continuous fibers can be introduced in the plastic melt, but cut glass fibers or powdered materials, such as chalk, talcum and the like, can also be fed through additional fill ports. The feed characteristic can be improved through the use of screw conveyors (German Pat. No. DE 38 41 728 C1) or feed screws (German Pat. No. DE 36 00 588 C1).

A continuous operating mode of the plasticizing unit is recommended for producing homogeneous plastic melts with single screw or multiple screw machines (extruders or kneaders). However, injection molding is an intermittent process, so that measures have to be taken to mate the continuous operation of the plasticizing unit to the intermittent operation of the injection molding machine.

It is known from German Pat. No. DE 198 59 472 A1 to drive fillers and additives into a polymer matrix using a continuously operating synchronized dual screw extruder and to supply the continuous melt flow alternatingly to two piston-type injection units, wherein each of the piston-type injection units is connected to a corresponding closing unit which houses the injection molds. In the described system, the melt exiting the plasticizing unit enters branch lines. Each branch line leads to a respective one of the two piston-type injection units, wherein the screw accumulator can be alternatingly connected to the two piston-type injection units through a switching valve. In operation, the melt flow, controlled by the switching valve, initially enters the screw accumulator of the first piston-type injection unit. After the screw accumulator is completely filled, the switching valve assumes an intermediate position where it interrupts the connection between the screw accumulator and piston accumulator. By subsequently applying pressure to the working piston of the piston-type injection unit, the melt which is located in the piston accumulator and permeated with long fibers is injected via an injection nozzle and a gate channel into the mold cavity of the injection mold. The pressure profile necessary to produce the injection molded part in the mold cavity is established by controllably applying a hydraulic pressure to the work piston.

U.S. Pat. No. 5,454,995 discloses supplying a plastic melt from a continuously operating extruder alternatingly to two piston-type injection units via a switching valve and connecting lines having check valves. A melt outlet line extends from each of the piston accumulators of the two piston-type injection units which hold the melt. The melt outlet lines terminate in a corresponding additional switched check valve, through which the melt enters a connecting channel to be transported to the injection mold. In operation, the two switching valves are controlled so that the injection mold is filled and maintained under pressure while the melt is removed from the accumulator of a first piston-type injection unit and the accumulator of the other piston unit is filled with new melt.

A system with two parallel piston-type injection units, as described in the above-referenced Pat. Nos DE 198 59 472 A1 and U.S. Pat. No. 5,454,995, is relatively complex and difficult to control, because depending on the injection molding cycle each piston-type injection unit has to be filled with at least the melt volume that is to be injected. The plasticizing capacity has to be adjusted to correspond exactly to the melt quantity required for the injection molding cycle. If the cycle in the injection molding process is interrupted and the first injection piston has not yet retracted, then the expelled melt cannot be buffered after the second injection unit is filled, unless the extruder capacity is changed. This causes the pressure in the extruder to increase, requiring an immediate shutdown of the extruder. The melt material remaining in the extruder can thereby be damaged, which tends to be critical when processing natural fiber products. The potential necessary interruption of the production process may reduce the system uptime due to the need for restarting the system and scrapping parts. Moreover, the switching valve located before the piston-type injection units can causes overlapping mass flows and pressure peaks in the plasticizing unit.

German Pat. No. DE 1 142 229 discloses the operation of an injection molding machine with an injection unit which has a continuously operating extruder with a plasticizing unit and an intermittently operating piston-type injection unit, as well as means for intermediate storage of the melt. The melt produced by the continuously operating extruder initially flows through a feed line to a melt reservoir which has a piston connected to a pressure reservoir. The plastic melt flows from the reservoir through a line and a check valve into the piston accumulator of the piston-type injection unit, from which the plastic melt is removed by applying pressure to the work piston and injected through a nozzle into the injection mold. During the injection phase, the check valve closes the melt line between the melt reservoir and the piston-type injection unit, and the melt supplied by the continuously operating extruder displaces the pressure piston in the melt reservoir. As a result, the remaining pressure medium in the pressure reservoir, such as air or gas, is pressurized until the injection piston begins its return motion after the injection phase is completed and the piston accumulator is ready to receive a new melt. The pressurized pressure medium causes the pressure piston in the melt reservoir to transfer the plasticizing plastic from the melt reservoir to the piston accumulator; simultaneously, melt is also transferred from the extruder to the piston accumulator via the reservoir.

German Pat. No. DE 197 15 229 A1 discloses an injection unit of the aforedescribed type, which has a cylindrical melt reservoir with a work piston instead of a pressure reservoir. In one embodiment, the cylindrical melt reservoir is filled with a melt from a lower side near the cylinder base, causing the work piston to be pushed upwardly. In another embodiment, the melt can be introduced from an upper side and a melt distributor can be placed in the cylinder, causing the melt to flow uniformly downward around the piston. For discharging the melt, the work piston moves downward and is held in place in the lower position, while additional melt produced by the extruder of the plasticizing unit flows along the piston directly into the piston accumulator of the piston-type injection unit.

The two injection units described above have the disadvantage if the cycle is interrupted during the injection molding process and the injection piston is not yet retracted, the discharged melt can only be buffered in a quantity equal to the volume of a single melt reservoir. The melt flow can only be controlled by varying the plasticizing capacity of the extruder. Depending on the settings for the pressure reservoir in German Pat. No. DE 1 142 229 or the dimensions of the piston cylinder unit of DE 197 15 229 A1, the pressure in the extruder will sooner or later increase, making it necessary to disconnect the extruder, which has the adverse effects discussed above with reference to German Pat. No. DE 198 59 472 A1 and U.S. Pat. No. 5,454,995.

It would therefore be desirable and advantageous to provide an improved injection unit for injection molding machines with a continuously operating plasticizing unit and piston-type injection unit, which obviates prior art shortcomings and is capable to react more reliably and more flexibly to interruptions of the production process while requiring a complete shut down only in the event of a major malfunction.

SUMMARY OF THE INVENTION

According to one aspect of the present invention, an injection assembly for an injection molding machine with a continuously operating plasticizing unit includes a piston-type injection unit; a plurality of melt reservoirs for storing a melt, with the melt reservoirs disposed between the plasticizing unit and the piston-type injection unit and having melt inlet openings; and melt lines merging with the melt inlet openings and connecting the plurality of melt reservoirs with one another and with the plasticizing unit, with each melt reservoir having an actuatable work piston for discharging the melt, wherein the work pistons can be moved into a closure position to close the melt inlet openings in the melt reservoirs for the purpose of diverting a flow of the melt.

According to another aspect of the invention, an injection assembly for an injection molding machine with a continuously operating plasticizing unit includes a piston-type injection unit receiving melt from the plasticizing unit and having a cylinder, which defines an interior space, and an injection piston moveably received in the cylinder and dividing the interior space in an anterior chamber, representing an injection space, and a posterior chamber, representing a melt reservoir, wherein the cylinder includes a melt inlet opening so located at a side of the cylinder that the anterior chamber is filled with melt, when the injection piston is disposed behind the inlet opening, and that the posterior chamber is filled with melt, when the injection piston is located in front of the inlet opening, wherein the injection piston has at least one overflow valve constructed to open during a return motion of the piston so as to allow a flow of melt from the melt reservoir into the injection space, and to close during a forward motion of the injection piston.

According to yet another aspect of the invention, an injection unit for an injection molding machine with a continuously operating plasticizing unit includes a piston-type injection unit receiving melt from the plasticizing unit and having a cylinder, which defines an interior space, and an injection piston moveably received in the cylinder and dividing the interior space in an anterior chamber, representing an injection space, and a posterior chamber, representing a melt reservoir, said cylinder including a melt inlet opening so located at a side of the cylinder that the anterior chamber is filled with melt, when the injection piston is disposed behind the inlet opening, and that the posterior chamber is filled with melt, when the injection piston is located in front of the inlet opening; and passageway means including at least one overflow channel to connect the melt reservoir with the injection space so as to allow a flow of melt from the melt reservoir into the injection space during a return motion of the injection piston.

Providing several melt reservoirs advantageously increases the total volume $V_{tot}$ of bufferable melt. The melt reservoirs are also provided with actively actuatable work pistons, so that the reservoir volumes ($V_s$) and the outflow (discharge) velocity ($dV_s/dT$) of the individual melt reservoirs can be adjusted individually and separately from each other. This makes the process highly flexible in the event of a malfunction. Moreover, the reservoir volumes $V_s$ and the outflow velocity $dV_s/dT$ of the individual reservoirs can be optimally matched to the injection molding process, for example adapted to the size of the injection molded parts, the cool-down time, the removal time for the formed parts and other characteristic parameters. Switching valves are eliminated since the melt flow is switched directly by the work piston. This arrangement reduces the technical complexity of the apparatus and the control system. In addition, long fibers or natural fibers which can be damaged when passing through the valves are also processed more advantageously.

Advantageously, the need for separate melt reservoirs can be obviated by integrating the melt reservoirs in the piston-type injection unit and forming the space behind the piston as a melt reservoir with sufficient capacity. The melt reservoir typically holds approximately half of the total volume of the cylinder. When the piston has reached the forward end position in the filling phase, essentially the entire cylinder volume is available as melt reservoir, except for the piston elements. This corresponds to approximately twice the shot weight of the injection unit.

According to another feature of the present invention, overflow valves can be incorporated in the injection piston of the piston-type injection unit.

According to yet another feature of the present invention, overflow channels may be provided in the cylinder of the piston-type injection unit so as to allow the plastic melt to flow from the space behind the piston (melt reservoir) to the piston accumulator (injection space).

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
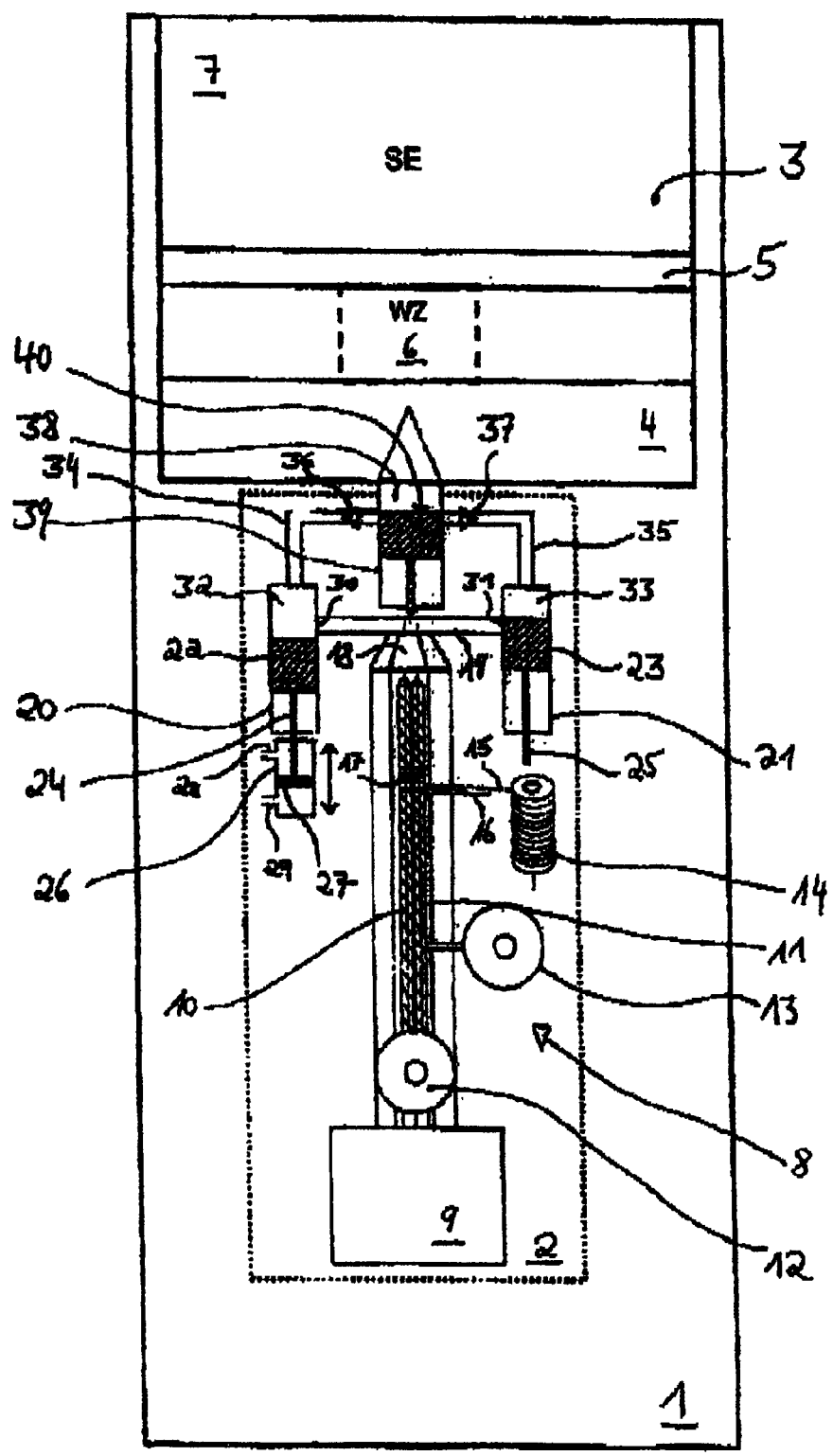
FIG. 1 is a schematic illustration of a first embodiment of an injection assembly according to the present invention, including a melt reservoir and a piston-type injection unit.

Throughout all the Figures, same or corresponding elements are generally indicated by same reference numerals.

The invention is directed to an injection assembly for injection molding machines. Several exemplary embodiments of a plasticizing unit with a dual screw extruder will be described. However, other screw-type mixing and plasticizing machines with forced feeding can also be employed, for example, single screw or multiple screw extruders, continuously operating kneaders and the like.

Referring now to FIG. 1, a machine bed 1 supports an injection unit 2 and a closing unit 3. The closing unit 3 includes a fixed mold mounting plate 4, a moveable mold mounting plate 5, an injection mold 6, as well as elements 7 for opening and closing the closing unit. The plasticizing unit 8 includes essentially the screws 10 and 11 which are continuously driven by a rotary drive 9 in the same direction, a first fill funnel 12 for supplying base material, an additional fill funnel 17 for supplying pourable additives, and a roving 14 for feeding long fibers 15 through a feed opening 16. The screws 10 and 11 are provided with kneading disks in the region where the long fibers are fed. In operation, the plastic base material is melted in the plasticizing unit 8, mixed with the additives and the long fibers and processed into a compound. This melt is transported from the screw accumulator 18 to a manifold 19 and flows from there to the two melt reservoirs 20 and 21. The melt reservoirs 20 and 21 Include work pistons 22 and 23 which are operatively connected via piston rods 24, 25 to actuating pistons of double-acting hydraulic cylinders. For sake of clarity, FIG. 1 shows only the hydraulic cylinder 26 associated with the melt reservoir 20 and the actuating piston 27 reversibly guided therein. The hydraulic connections 28 and 29 alternatingly apply a pressure medium to the actuating piston 27. The manifold 19 does not include valves. In particular, with the system of the invention, switching valves for alternatingly filling the melt reservoir are entirely eliminated. However, cheek valves can optionally be provided on the manifold. The switching function is taken over by the work pistons 22 and 23 which are controlled so as to alternatingly close and open the melt inlet openings 30 and 31, as described below in more detail. The melt residing in the piston accumulators 32 and 33 is transported via connecting channels 34 and 35, in which check valves 36, 37 are arranged, to the piston accumulator 38 of the piston-type injection unit 39 and injected in the mold 6 by the injection piston 40.

In operation, the melt continuously discharged from the plasticizing unit 8 is supplied alternatingly to one of the two melt reservoirs 20, 21. In normal operation (in the absence of a malfunction), the melt inlet openings 30, 31 close and open synchronously with the injection molding cycle, in particular with the modes "metering" and "injection, including post-pressure". When the system begins to fill (beginning of the cycle), the injection piston 40 closes the inlet openings of the connecting channels 34 and 35 in the piston accumulator. In addition, the work piston 23 closes the inlet opening 31 of the second melt reservoir 33. The work piston 22 is retracted until the inlet opening 30 of the first melt reservoir 20 is clear. The melt exiting the plasticizing unit 8 thereby enters the piston accumulator 32 of the first melt reservoir 20. When the melt quantity in the melt reservoir 20 attains the minimum feed volume (according to the shot weight), the work piston 22 moves forward, while the injection piston 40 is simultaneously retracted, until the inlet opening of the connecting channels 34 in the piston accumulator 38 is clear. The buffered melt can then flow from the melt reservoir 20 into the piston accumulator 38 of the piston-type injection unit 39. The melt forces the injection piston 40 backward during the melt transfusion. The work piston 23 moves clear of the inlet openings 31 of the melt reservoir 21 at the same time the work piston 22 moves forward after closing the inlet opening 30 of the melt reservoir 20. After the melt is transfused, the direct injection and post-pressure phases begins. The increasing pressure exerted by the work piston 40 closes the two check valves 36 and 37. During the transfusion step, the melt that is continuously discharged from the plasticizing unit 8 continues to flow into the second melt reservoir 21 while pushing/pulling the work piston 23 back. At completion of the post-pressure phase, the injection piston 40 is again retracted, clearing the inlet openings leading to the piston accumulator 38 of the piston-type injection unit 39. The work piston 23 subsequently moves forward, while the work piston 22 is retracted until the melt inlet opening 30 is clear. The melt is thereby transfused from the second melt reservoir 21 to the piston accumulator 38, while the first melt reservoir 20 is simultaneously filled. At this point, a new cycle starts.

If a malfunction occurs in the cycle and/or process, then the work pistons 22 and 23 can be retracted further during the fill mode, thereby releasing additional melt reservoir. When the rear end position is reached while the melt reservoir 22 or 23 is being filled, two additional storage options are possible depending on the position of the injection piston 40. If the injection piston 40 can be retracted, then the transfusion step is started and the piston accumulator 38 is filled next. If this is not possible, then the other melt reservoir can be filled. In this case, both melt inlet openings 30 and 31 are open, providing an additional melt reservoir. In normal operation, switching always causes one of the melt reservoirs to be partially filled. The increased melt storage capacity also leaves more time for controlling the entire system. Subsequently, the plasticizing capacity on the plasticizing unit 8 can be reduced which eliminates discharging the melt through an outlet valve. The plasticizing capacity depends on the cycle time and can be controlled by adjusting the rotation speed of the extruder.

The melt flow can be more flexibly buffered by alternatingly filling the two melt reservoirs 20 and 21 and by using actively controlled work pistons 22, 23. Both the volume $V_s$ of the melt reservoirs and the outflow velocity $dV_s/dT$ can be optimally adjusted to match the injection molding cycle and can also be optimized during both start-up and cycle interruptions. For example, if a mold protection alarm is triggered and an ejection operation has to be repeated, then $V_s$ and $dV_s/dT$ can be adapted so that the plasticizing unit can continue to operate with the same plasticizing capacity. The additional melt quantity exiting during the delay time is compensated by slightly reducing the plasticizing capacity, which has no effect on quality. The plasticizing capacity is changed depending on the cycle time and can be controlled by adjusting the rotation speed of the extruder and/or kneader. The plasticizing capacity has to be reduced only when a more severe malfunction occurs, i.e., when the melt flow can no longer be sufficiently buffered by varying the fill volume $V_s$ of the reservoir and the transfusion velocity $dV_s/dT$. Only under exceptional circumstances will it be necessary to power the plasticizing unit 8 down or to shut the plasticizing unit 8 down completely.

Figure 2:
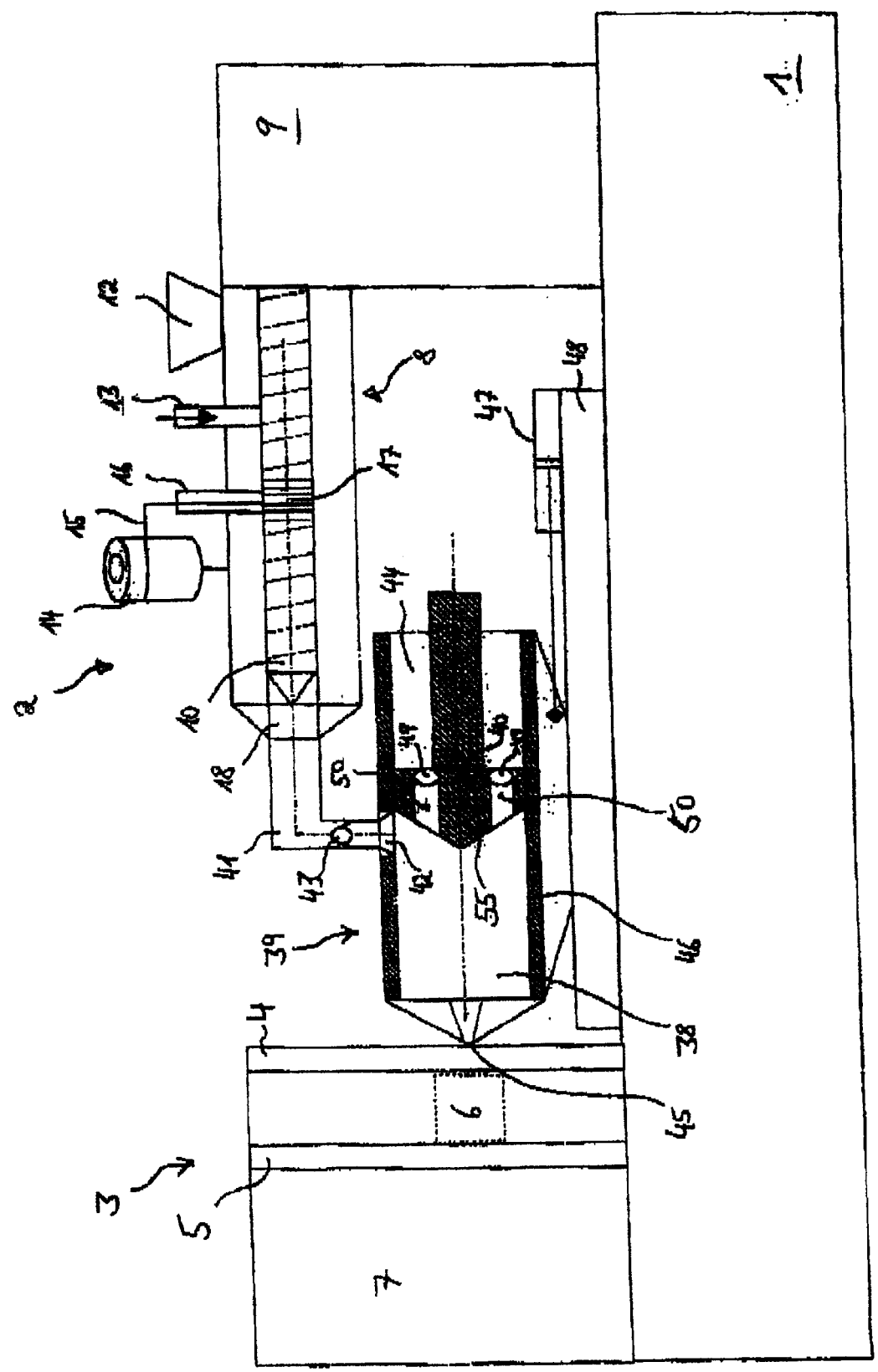
FIG. 2 is a schematic illustration of a second embodiment of an injection assembly according to the present invention, including a melt reservoir integrated in a piston-type injection unit and having overflow valves.

In the embodiment depicted in FIG. 2, the melt reservoir is integrated in the piston-type injection unit 39. The entire injection unit 2 and/or only the piston-type injection unit 39 can be moved by a piston cylinder unit 47 on a guide rail 48 towards or away from the closing unit 3. The closing unit 3 and the injection unit 2 are constructed in essentially the same way as the embodiment of FIG. 1. Therefore, only the essential differences will be described here. A hot channel 41 branches off the screw accumulator 18. The hot channel 41 terminates approximately in the middle of an inlet opening 42 provided on a side of the cylinder 46 of the piston-type injection unit 39, with a check valve 43 disposed in the inlet opening 42. The volume of the piston accumulator 38 and the melt reservoir 44 depends on the position of the piston. In normal operation, at least one shot is present in the melt reservoir 44. The volume of the melt reservoir increases with the displacement of the piston 40 towards the nozzle 46. It is therefore reasonable to place the inlet opening 42 in the center. The piston accumulator 38 receives and discharges the melt that is to be injected into the injection mold 6 where the melt is kept under pressure. The space behind the injection piston 40 serves as a melt reservoir 44. In operation, the base material is melted and homogenized together with the additives and/or the continuous fibers. The additives and/or rovings can advantageously be natural fiber products. The melt exiting the screw accumulator 18 flows into the piston accumulator 38 of the piston-type injection unit 39 through the hot channel 41 and the inlet opening 42. When the mold quantity is sufficient for exactly one shot, the injection piston 40 is moved forward towards the injection nozzle 45 by a hydraulic unit (not shown), and the injection process begins. After the mold quantity required for the shot is discharged, the injection piston 40 is maintained under pressure until the post-pressure phase is completed. In this phase the injection piston 40 is located before the inlet opening 42, so that the melt, which is continuously produced by the plasticizing unit 8, can flow into the melt reservoir 49 located behind the injection piston 40, where the melt is buffered. When the injection piston 40 is controllably retracted and has moved across the inlet opening 42, the melt is again transferred directly into the piston accumulator 38. When the injection piston 40 retracts, the melt that is buffered in the melt reservoir 44 behind the injection piston 40 is compressed and, as a result, opens one or more overflow valves 49 disposed in the injection piston 40. The melt can then flow into the piston accumulator 38 through the clear through openings 50. One or more ball valves, or an annular overflow valve extending over the piston periphery can be provided. The through-opening should have the largest possible clear cross section to allow rapid transfusion and prevent damage to the length of the fiber fraction. For example, if the valve has an annular shape, then a valve element having a toroidal shape could be inserted in an annular recess with a V-shaped cross-section or with a cross-section that matches the toroidal shape of the valve element. When the injection piston has reached its rear end position, the buffered melt is completely pushed out the melt reservoir 44. As long as the injection piston 40 resides behind the inlet opening 42, the melt produced by the plasticizing unit 8 can flow directly into the piston accumulator 38 until the required shot volume is reached. Thereafter, a new cycle begins, with the injection piston 40 again moving forward. During the forward motion and as a result of the contact with the melt, the overflow valves 49 close the through-openings 50, operating like a check valve, so that the melt located in the piston accumulator 38 can flow to the nozzle 45.

Figure 3:
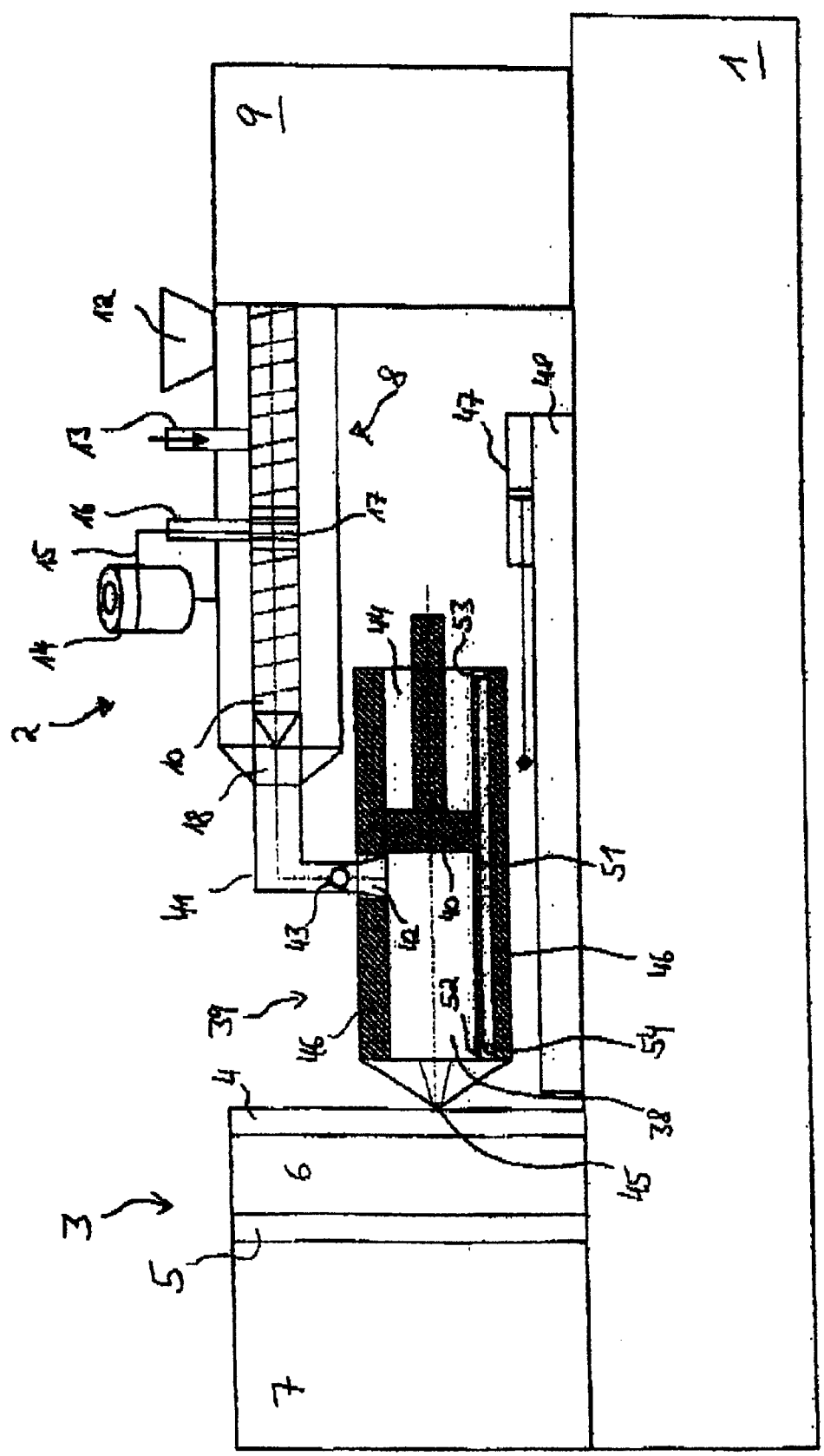
FIG. 3 is a schematic illustration of a third embodiment of an injection assembly according to the present invention, including a melt reservoir integrated in the piston-type injection unit and having overflow channels.

FIG. 3 shows a modified embodiment for integrating the melt reservoir in the piston-type injection unit. Instead of providing overflow valves in the piston, one or more overflow channels 51 can be integrated in the cylinder 46 of the piston-type injection unit 39. The front opening 52 of the overflow channel 51 should advantageously be arranged on the front end of the cylinder 46 of the piston-type injection unit 39, whereas the rear opening 53 is advantageously provided on the rear end of the cylinder 46. The overflow channels can be formed as through-bores with recesses located at the beginning and end of the cylinder 46 for connecting the through-bores with the cylinder space. An additional ball check valve 54 can be included in the recesses on the front end, i.e., in the region of the front opening 52. The overflow channel 51 thereby operates as a melt transfer line that extends from the melt reservoir 44 located behind the injection piston 40 to the piston accumulator 38. All other elements and features corresponds to those of the embodiment of FIG. 2. If the piston is located at its rear end position, then the melt can flow directly through the inlet opening 42 into the piston accumulator 38. Thereafter, the injection piston 40 starts its forward motion. The melt reaches the melt reservoir 44 after moving over the inlet opening 42. When the injection piston 40 retracts, the melt is pushed from the melt reservoir 44 through the rear opening 53 into the overflow channel 51 and forward into the piston accumulator 38. The discharged melt then reaches directly the piston accumulator 38 after the piston 40 has moved over the inlet opening 42. A new cycle starts when the injection piston 40 reaches its rear end position. The check valve 54 disposed in the overflow channel 51 ensures that melt cannot flow back from the piston accumulator during the forward motion of the injection piston. In this position, the front opening 52 can have an arbitrary location, for example, on the end of the piston accumulator 38 with the nozzle. The location of the front opening 52 can also be selected so that the melt volume located before the opening is sufficient for at least one shot. In this case, the check valve 54 can be eliminated, since the melt volume that exists after moving across the front opening 52 can now be pressurized by the injection piston 40 and injected into the injection mold, without the melt being able to flow from the piston accumulator 38 back into the melt reservoir 44. The location of the rear opening 53 determines the quantity of the melt that can be pushed out of the melt reservoir 44 when the injection piston 40 moves backwards. The melt reservoir 44 can be almost completely emptied if the opening 53 is located on the rear end of the melt reservoir 44.

In the embodiments depicted in FIGS. 2 and 3, a compensating element 55 can be provided on the injection piston 40, so that in an intermediate position of the injection piston the volume of the melt reservoir 44 is substantially equal to the volume of the piston accumulator 38, which is conically tapered toward the nozzle 45. FIG. 2 shows such compensating element in the form of a conical adapter placed on the front face of the injection piston 40. Making the two volumes identical ensures a constant and reproducible shot weight.

While the invention has been illustrated and described as embodied in an injection unit for an injection molding machine with continuously operating plasticizing unit, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. An injection assembly for use in an injection molding machine having a continuously operating plasticizing unit, comprising:
   a piston injection unit receiving melt from the plasticizing unit;
   a plurality of melt reservoirs for storing melt, said melt reservoirs disposed between the plasticizing unit and the piston injection unit and having melt inlet openings; and
   a manifold connected to the melt inlet openings and connecting the plurality of melt reservoirs with one another and with the plasticizing unit,
   each melt reservoir having an actuatable work piston for discharging the melt, wherein the work pistons can be moved into a closure position to close the melt inlet openings in the melt reservoirs for the purpose of diverting a flow of the melt.

2. The injection assembly of claim 1, wherein the manifold is constructed without incorporation of valves.

3. The injection assembly of claim 1, wherein the melt reservoirs are disposed on opposite ends of the manifold.

4. An injection assembly for use in an injection molding machine having a continuously operating plasticizing unit, comprising:
   a piston injection unit receiving melt from the plasticizing unit and having a cylinder, which defines an interior space, and an injection piston moveably received in the cylinder end dividing the interior space in an anterior chamber, representing an injection space, and a posterior chamber, representing a melt reservoir, said cylinder including a melt inlet opening so located at a side of the cylinder that the anterior chamber is filled with melt, when the injection piston is disposed behind the inlet opening, and that the posterior chamber is filled with melt, when the injection piston is located in front of the inlet opening, wherein the injection piston has at least one overflow valve constructed to open during a return motion of the piston so as to allow a flow of melt from the melt reservoir into the injection space, and to close during a forward motion or the injection piston.

5. The injection assembly of claim 4, wherein the at least one overflow valve is implemented as a ball valve.

6. The injection assembly of claim 4, wherein the at least one overflow valve is implemented as an annular valve extending across an entire periphery of the injection piston.

7. The injection assembly of claim 4, wherein the injection piston includes a compensating element configured such that at intermediate disposition of the injection piston in the interior space, the injection space has a volume which is substantially identical to a volume of the melt reservoir.

8. The injection assembly of claim 7, wherein the compensating element has a conical shape and is disposed on a front face of the injection piston.

9. An injection assembly for use in an injection molding machine having a continuously operating plasticizing unit, comprising:
   a piston injection unit receiving melt from the plasticizing unit and having a cylinder, which defines an interior space and an injection piston moveably received in the cylinder and dividing the interior space in an anterior chamber, representing an injection space, and a posterior chamber, representing a melt reservoir, said cylinder including a melt inlet opening so located at a side of the cylinder that the anterior chamber is filled with melt, when the injection piston is disposed behind the inlet opening, and that the posterior chamber is filled with melt, when the injection piston is located in front of the inlet opening; and
   passageway means including at least one overflow channel to connect the melt reservoir with the injection space so as to allow a flow of melt from the melt reservoir into the injection space during a return motion of the injection piston.

10. The injection assembly of claim 9, wherein the passageway means includes front openings located in the injection space substantially proximate to a forward end face of the cylinder.

11. The injection assembly of claim 9, wherein the passageway means includes rear openings located in the melt reservoir substantially proximate to a rearward end face of the cylinder.

12. The injection assembly of claim 9, and further comprising check valves disposed in the passageway means.

13. The injection assembly of claim 9, wherein the passageway means is disposed within the cylinder of the piston injection unit.

14. The injection assembly of claim 9, wherein the passageway means is disposed outside the cylinder of the piston injection unit.

15. The injection assembly of claim 9, wherein the passageway means is implemented as a tube or pipe connection between the melt reservoir and the injection space.

16. The injection assembly of claim 9, wherein the injection piston includes a compensating element configured such that at intermediate disposition of the injection piston in the interior space, the injection space has a volume which is substantially identical to a volume of the melt reservoir.

17. The injection assembly of claim 15, wherein the compensating element has a conical shape and is disposed on a front face of the injection piston.

* * * * *